United States Patent [19]
Crockett et al.

[11] Patent Number: 6,105,078
[45] Date of Patent: Aug. 15, 2000

[54] EXTENDED REMOTE COPYING SYSTEM FOR REPORTING BOTH ACTIVE AND IDLE CONDITIONS WHEREIN THE IDLE CONDITION INDICATES NO UPDATES TO THE SYSTEM FOR A PREDETERMINED TIME PERIOD

[75] Inventors: Robert Nelson Crockett; Ronald Maynard Kern; Gregory Edward McBride, all of Tuscon, Ariz.

[73] Assignee: International Business Machines Corporation, Armonk, N.Y.

[21] Appl. No.: 08/993,543

[22] Filed: Dec. 18, 1997

[51] Int. Cl.$^7$ ..................................................... G06F 11/34
[52] U.S. Cl. ............................... 710/18; 710/15; 711/112; 711/162; 714/6; 714/13
[58] Field of Search .................................. 710/18, 15, 1; 379/23; 711/112, 162; 714/6, 13

[56] References Cited

U.S. PATENT DOCUMENTS

| | | | |
|---|---|---|---|
| 3,676,604 | 7/1972 | Whitemyer | 379/23 |
| 4,556,972 | 12/1985 | Chan et al. | 370/354 |
| 4,803,679 | 2/1989 | Shimizu | 455/528 |
| 5,179,660 | 1/1993 | Devany et al. | 709/219 |
| 5,446,871 | 8/1995 | Shomler et al. | 714/1 |
| 5,504,861 | 4/1996 | Crockett et al. | 714/13 |
| 5,555,371 | 9/1996 | Duyanovich et al. | 714/13 |
| 5,574,950 | 11/1996 | Hathorn et al. | 710/8 |
| 5,577,222 | 11/1996 | Micka et al. | 711/112 |
| 5,592,618 | 1/1997 | Micka et al. | 711/162 |
| 5,594,900 | 1/1997 | Cohn et al. | 707/202 |
| 5,615,329 | 3/1997 | Kern et al. | 714/6 |
| 5,619,644 | 4/1997 | Crockett et al. | 714/13 |
| 5,754,883 | 5/1998 | Lim et al. | 710/18 |
| 5,903,851 | 5/1999 | Backstrom et al. | 455/557 |

FOREIGN PATENT DOCUMENTS

| | | |
|---|---|---|
| 0 672 985 A1 | 9/1995 | European Pat. Off. . |
| 0 674 263 A1 | 9/1995 | European Pat. Off. . |
| 361073464A | 4/1986 | Japan . |
| 363163566A | 7/1988 | Japan . |
| 8-044685 | 2/1996 | Japan . |

OTHER PUBLICATIONS

IBM Technical Disclosure Bulletin, vol. 39, No. 10, Oct. 1996.

IBM Technical Disclosure Bulletin, vol. 39, No. 05, May 1996.

IBM Technical Disclosure Bulletin, vol. 39, No. 01, Jan. 1996.

ACM Press, Special Issue vol. 16, No. 1, May 1988, "Proceedings of the 1988 ACM SIGMETRICS Measurement and Modeling of Computer Systems".

Proceedings 13th Conference on Local Computer Networks Oct. 1988, "Algorithms for File Replication in a Distributed System".

The Journal of Systems and Software, vol. 14, No. 3, Mar. 1991, "Algorithms for File Replication in a Distributed System".

*Primary Examiner*—Thomas C. Lee
*Assistant Examiner*—Tammara Peyton
*Attorney, Agent, or Firm*—David W. Victor; Konrad Raynes & Victor

[57] ABSTRACT

A primary data mover monitors both consistency time and idle time in a system that performs continuous, asynchronous, extended remote copying between primary and remote processors, and manages both with accuracy and consistency. The primary data mover detects system activity levels and manages data accuracy for the extended remote copying in both active and idle systems.

30 Claims, 9 Drawing Sheets

| CONFIGURATION INFORMATION ||
|---|---|
| PRIMARY | SECONDARY |
| SSID #1<br>VOLUME 1<br>EXTENT<br>*<br>*<br>*<br>VOLUME 2<br>*<br>*<br>*<br>SSID #2<br>VOLUME 1<br>*<br>*<br>*<br>VOLUME 2<br>*<br>*<br>* | SSID #1'<br>VOLUME 1<br>EXTENT<br>*<br>*<br>*<br>VOLUME 2<br>*<br>*<br>*<br>SSID #2'<br>VOLUME 1<br>*<br>*<br>*<br>VOLUME 2<br>*<br>*<br>* |

FIG. 6

| PHYSICAL CONTROLLER ID | OPERATIONAL TIMESTAMP | TIME INT GROUP # | READ RECORD SET TIME OF UPDATE / CONTROLLER | | |
|---|---|---|---|---|---|
| | | | SEQ. 1 OF 3 | SEQ. 2 OF 3 | SEQ. 3 OF 3 |
| SSID1 | T1 | G1 | 11:59 (2) | 12:00 (5) | 12:01 (6) |
| SSID2 | T1 | G1 | 12:00 (4) | 12:02 (7) | |
| SSID3 | T1 | G1 | 11:58 (1) | 11:59 (3) | 12:02 (8) |
| SSID1 | T2 | G2 | | | |
| SSID2 | T2 | G2 | | | |
| SSID3 | T2 | G2 | | | |
| ⋮ | ⋮ | ⋮ | | | |

CONSISTENCY GROUP #1:
(1) 11:58, (2) 11:59, (3) 11:59, (4) 12:00, (5) 12:00, (6) 12:01

CONSISTENCY GROUP #2:
(7) 12:02, (8) 12:02, ...

EXTENDED REMOTE COPYING SYSTEM FOR REPORTING BOTH ACTIVE AND IDLE CONDITIONS WHEREIN THE IDLE CONDITION INDICATES NO UPDATES TO THE SYSTEM FOR A PREDETERMINED TIME PERIOD

BACKGROUND OF THE INVENTION

1. Field of the Invention

The present invention relates generally to an extended remote copy operation for data on direct access storage devices, and more particularly, to a system that insures data consistency in an extended remote copy operation without updates.

2. Description of Related Art

Data processing systems typically are required to store large amounts of data. Having a back-up data copy is mandatory for many businesses as data loss could be catastrophic to the business. Moreover, disaster recovery requires that the secondary copy of data be stored at a location remote from the primary data.

A known method of providing disaster protection is to back-up data to tape, on a daily or weekly basis, etc. The tape is then taken to a secure storage area that is usually located remote from the primary data location. A problem is presented in this back-up plan in that it could take days to retrieve the back-up data, and meanwhile several hours or even days of data could be lost, or worst, the storage location could be destroyed by the same disaster.

A somewhat improved back-up method would be to transmit data to a back-up location each night. This allows the data to be stored at a more remote location. Again, some data may be lost between back-ups since back-up does not occur continuously, as in the dual copy solution. Hence, a substantial data amount could be lost which may be unacceptable to some users.

More recently introduced data disaster recovery solutions include extended remote copy operations, wherein data is backed-up not only remotely, but also continuously. In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Accordingly, there is a need in the art for a method managing data consistency in such environments. More specifically, the challenge is how to insure consistency in an environment where heavy updates occur at one point in time and the system can be completely idle at another point in time, and then report the consistency time accurately.

SUMMARY OF THE INVENTION

To overcome the limitations in the prior art described above, and to overcome other limitations that will become apparent upon reading and understanding the present specification, the present invention discloses a primary data mover that monitors both consistency time and idle time in a system that performs continuous, asynchronous, extended remote copying between primary and remote processors, and manages both with accuracy and consistency. The primary data mover detects system activity levels and manages data accuracy for the extended remote copying in both active and idle systems.

An object of the present invention is to provide an improved design and method for performing "data shadowing", i.e., duplicating updates from a primary site to a remote, secondary site.

BRIEF DESCRIPTION OF THE DRAWING

FIGS. 4 and 5 illustrate a state table and a master journal, respectively, according the present invention;

FIG. 6 illustrates an example of forming a consistency group, which could occur at either the primary site or secondary site;

DETAILED DESCRIPTION OF THE ILLUSTRATED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention monitors both consistency time and idle time in a system performing continuous, yet asynchronous, extended remote copying, and manages both with accuracy and consistency. The present invention maintains data consistency with heavy updates and idle activity levels in an update environment. Moreover, the present invention provides for the detection of system activity levels and management of data accuracy in active and idle system modes.

According to the present invention, when updates occur, a data mover obtains the latest consistency time from any primary storage controller that has update activity. When the application generates the update activity, the system appends a timestamp to mark the time the operation was initiated by the host processor. The data mover makes use of this timestamp to generate time groups defined as consistency groups, which are used to manage activity flow through the system. When the system enters an idle state, where no activity occurs on any primary storage controller, the data mover detects the idle condition and reports the last known consistency time and the time duration of the idle condition.

Extended Remote Copy System

Figure 1:
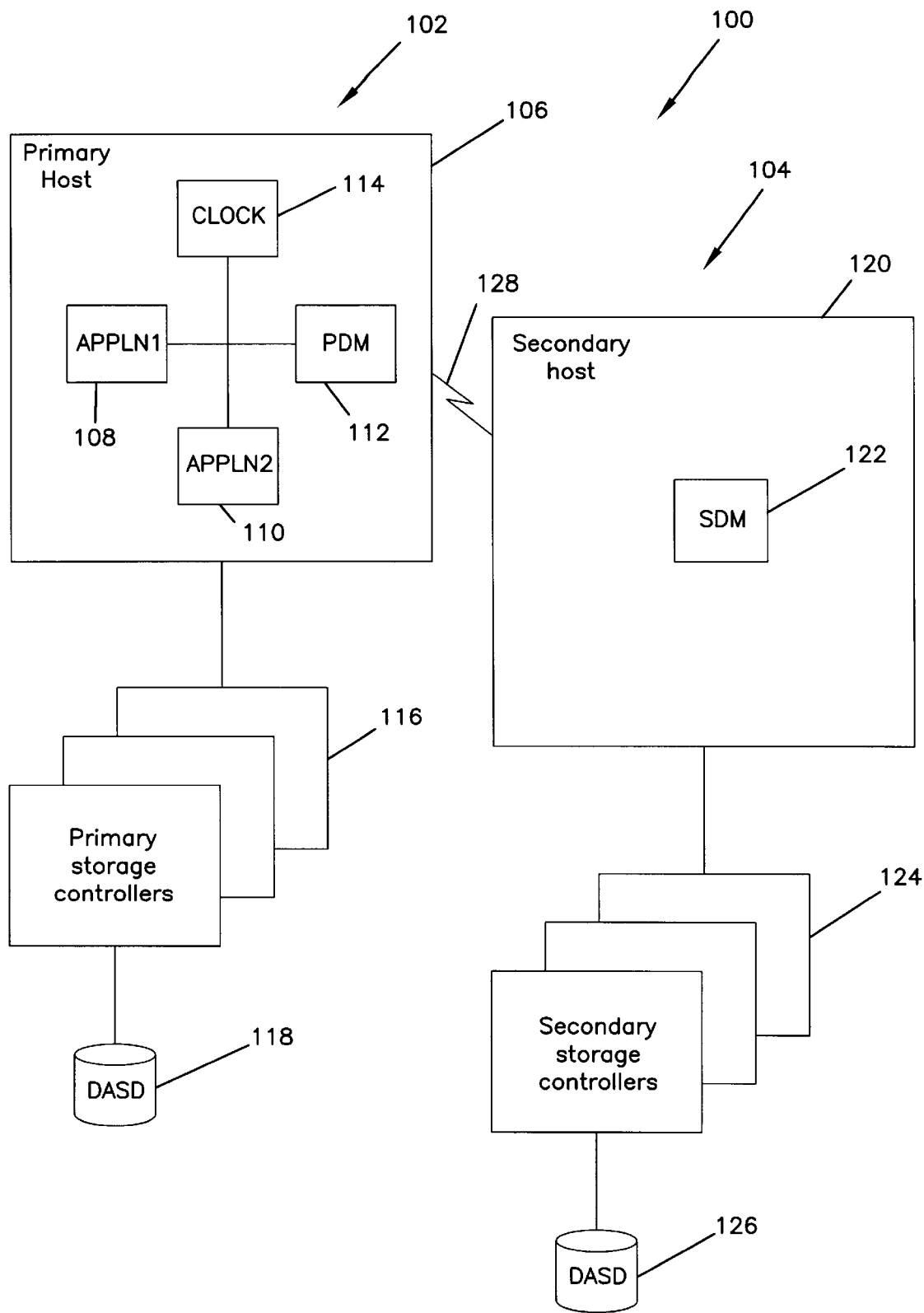
FIG. 1 depicts a system for performing Extended Remote Copy operations, wherein the system includes a local or primary site and a remote or secondary site.

FIG. 1 depicts a system 100 for performing Extended Remote Copy operations, wherein the system 100 includes a local or primary site 102 and a remote or secondary site 104. The primary site 102 includes a primary host processor 106, for example, IBM ESA/390 hardware and an ES/9000 environment running DFSMS/MVS software. The primary host processor 106 further includes one or more application programs (APPLN1) 108 and (APPLN2) 110, as well as a primary data mover (PDM) 112. A common sysplex clock 114 is included in the primary host processor 106 for providing a common time reference for the system, thereby ensuring that all time dependent processes are properly timed relative to one another.

One or more primary storage controllers 116, for example, IBM 3990 Model 6 storage controllers, are connected to the primary host processor 106 via one or more channels. Connected to each primary storage controller 116 is at least one string of primary DASDs 118, for example, IBM 3390 DASDs. The primary storage controllers 116 and the primary DASDs 118 form a primary storage subsystem.

The secondary site 104, located remote from the primary site 102, is similar to the primary site 102 and includes a secondary host processor 120 having a secondary data mover (SDM) 122 operating therein. One or more secondary storage controllers 124 are connected to the secondary host processor 120 via one or more channels and one or more secondary DASDs 126 are connected to the storage controllers 124. The secondary storage controllers 124 and DASDs 126 comprise a secondary storage subsystem.

The primary site 102 communicates with the secondary site 104 via a communication link 128, for example, a virtual telecommunications access method (VTAM) communication link 128. Such links can be realized by several suitable communication methods, including telephone (T1, T3 lines), radio, radio/telephone, microwave, satellite, etc.

The Extended Remote Copy operation collects data and control information from the primary storage controllers 116, so that the order of all write I/O operations to the primary DASDs 118 is preserved when these same write I/O operations are applied to the secondary DASDs 124 in the Extended Remote Copy operation, thereby preserving the write order made across the primary storage subsystem. The data and control information transmitted to the secondary site 104 must be sufficient such that the presence of the primary site 102 is no longer required to preserve data integrity.

The applications 108, 110 generate updates against the primary DASD 118, which are documented in update records that are generated by the primary storage controllers 116. The primary storage controllers 116 each group their respective update records and provides those update records to the PDM 112.

A READ UPDATE RECORD command is issued by the PDM 112 and can be predicated upon one of the following conditions:

(1) Primary storage controller 116 attention interrupt based upon a predetermined threshold for that primary storage controller 116;

(2) Primary host processor 106 timer interrupt based upon a predetermined time interval; or (3) Update record information indicates additional information on outstanding record updates available but not yet read.

Condition (2) uses a timer interval to control how far behind the secondary host processor 120 executes during periods of low activity. Condition (3) occurs when the PDM 112 fails to drain all record updates from the primary storage controllers 116 during a processing interval, which drives further activity for ensuring that the PDM 112 keeps up with activity on the primary storage controllers 116.

In the present invention, an analysis is performed by the PDM 112 of all update records received from all of the primary storage controllers 116. If there have been updates on any of the primary DASDs 118, the latest timestamp from the update records generated by the primary storage controllers 116 are reported as the PDM 112 consistency time. On the other hand, if there have been no updates on any of the primary DASDs 118 after a pre-determined time period, then the last known PDM 112 consistency time is maintained as such by the PDM 112.

In this situation, the PDM 112 notes that the primary site 102 is in an idle state, since there are no updates for any of the primary DASDs 118, and generates a timestamp to denote the start of the idle state. Upon request, or when update records are again generated by the primary storage controllers 116, the PDM 112 then reports the last known PDM 112 consistency time and the total time that the primary site 102 has been in the idle state (based on the difference from the time when the primary site 102 entered the idle state to the time being reported by the PDM 112). The summation of both the last known PDM 112 consistency time and the total time in the idle state provides all the information required to manage both busy and idle environments.

Journal Records

Figure 2:
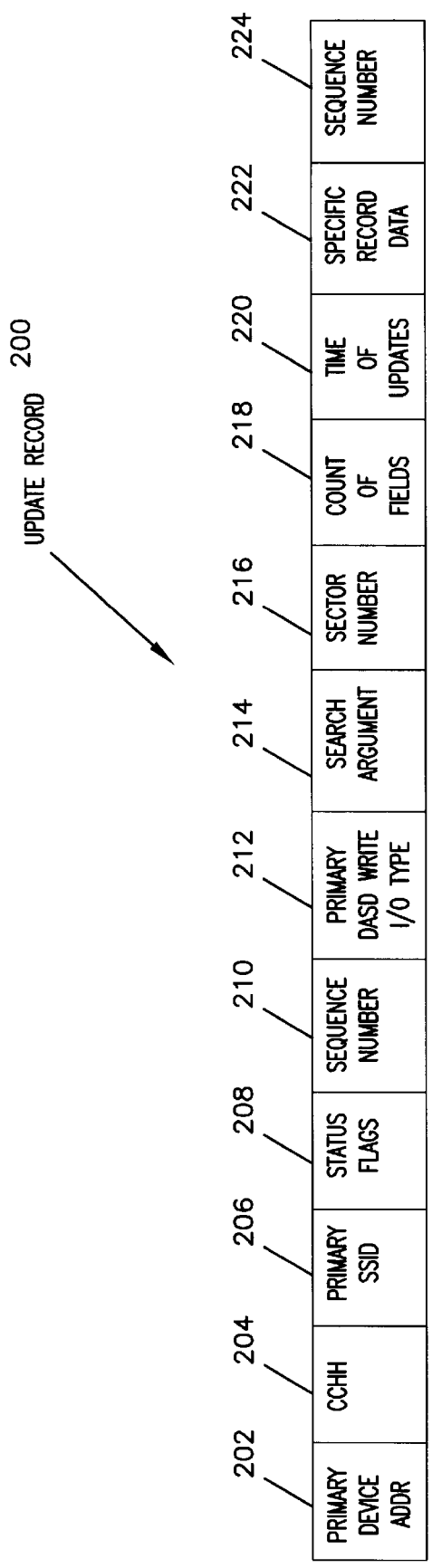
FIG. 2 illustrates the update record portion of a journal record created by the primary storage controller.
Figure 3:
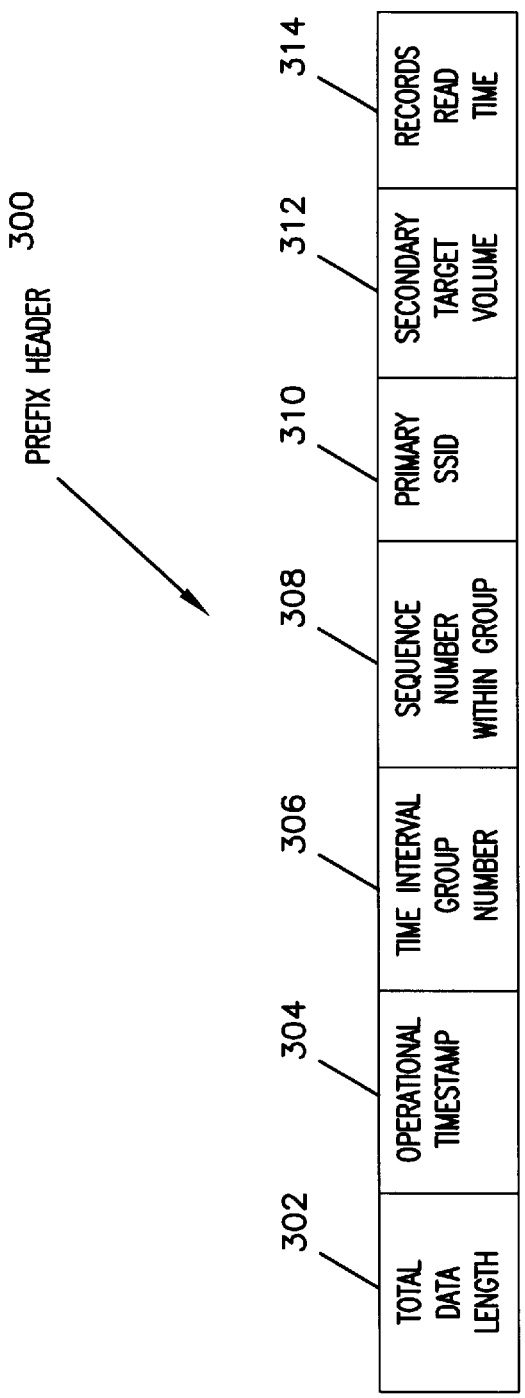
FIG. 3 illustrates the prefix header portion of the journal record created by the primary data mover.

FIG. 2 illustrates the update record portion 200 of a journal record created by the primary storage controller 116 and FIG. 3 illustrates the prefix header portion 300 of the journal record created by the PDM 112.

Referring now to FIG. 2, the update record 200 is generated by the primary storage controllers 116 and collected by the PDM 112. A primary device unit address 202 indicates the actual primary DASD 118 where the update occurred. A cylinder number/head number (CCHH) 204 indicates a location on primary DASD 118 for each update. A primary SSID 206 comprises a primary storage controller 116 session identifier. Status flags 208 provide status information regarding whether specific record data 222 follow in the update record 200. Sequence numbers 210 and 224 assign a number to each update record 200 to indicate whether the entire update record 200 has been read (i.e., all specific record data 222 has been transferred to the PDM 112). A primary DASD write I/O type 212 is an operation indicator identifying the type of update performed on the primary DASD 118, wherein the operation indicators include: update write; format write; partial track records follow; full track data follows; erase command performed; or write any performed. Search argument 214 indicates the initial positioning information for the first specific data record 222. A sector number 216 identifies the sector of the primary DASD 118 that was updated. Count of fields 218 describes a number of specific record data fields 222 that follow. Time of updates 220 provides a timestamp when the update on the primary DASD 118 occurred. Specific record data 222 provides a count/key/data (CKD) field for the update. Lastly, the sequence number 224 is compared to the sequence number 310 for indicating whether the entire update record 300 was transferred to the PDM 112.

Referring now to FIG. 3, the prefix header 300 is inserted at the front of each update record 200. A total data length 302 describes the total length of the prefix header 300 and update record 200. An operational timestamp 304 indicates a start time for the update record 200 that the PDM 112 is currently processing, wherein the operational timestamp 304 is generated by the PDM 112 according to the sysplex timer 114 when performing a READ UPDATE RECORD command to one or more of the primary storage controllers 116. A time interval group number 306 is supplied by the PDM 112 to identify a time interval (bounded by the operational timestamp 304 and records read time 308) for which the current update records 200 belong. A sequence number within group 308 is a hardware-provided identification (to the PDM 112) of a sequence for each update record 200 within a given time interval group 306. A primary SSID (substorage identification) 310 uniquely identifies the specific primary storage controller 116 for each update record 200. A secondary target volume 312 is assigned by either the PDM 112 or the SDM 122 depending upon performance considerations. A records read time 314 supplies an operational timestamp that is common to all primary storage controller 116 and indicates an end time for the update record 200 of the current interval.

State Table and Master Journal

Figure 5:
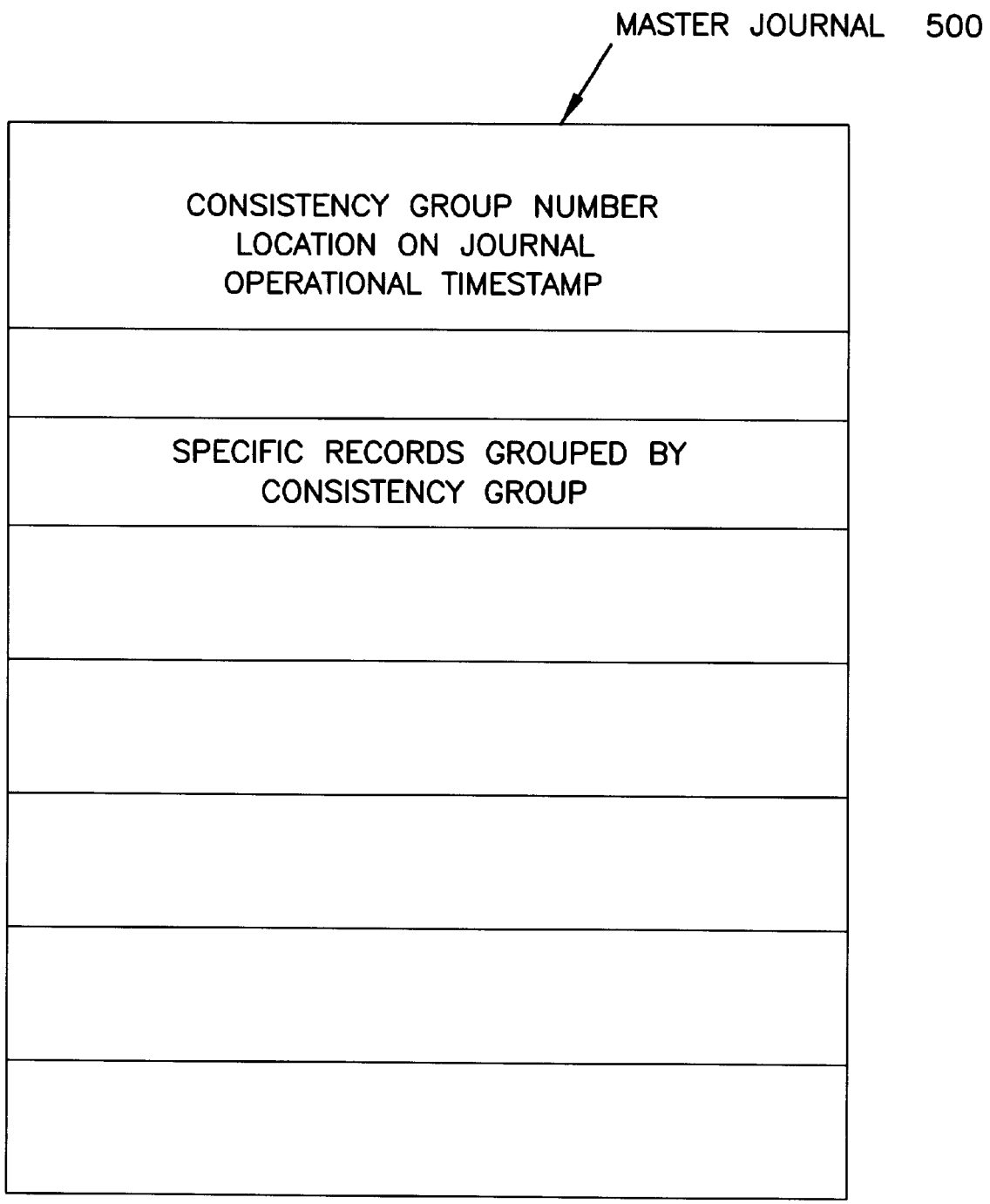

FIGS. 4 and 5 illustrate a state table 400 and a master journal 500, respectively, according the present invention. The state table 400 provides configuration information collected by the PDM 112, and includes primary storage controller 116 session identifiers (SSID numbers) and the volumes therein. The master journal 500 includes consistency group number; location on journal volumes; and operational timestamp. The master journal 500 further maintains specific update records 200 (and their prefix headers 300) as grouped in consistency groups.

A timestamp control is placed at the front and back of each master journal 500 to ensure that the entire entry was successfully written. The timestamp control is further written to the secondary DASDs 126. The control elements include dual entries (1) and (2), wherein one entry is always a current entry, for example:

(1) Timestamp control|Control Info|Timestamp Control.

(2) Timestamp Control|Control Info|Timestamp Control.

At any point in time either entry (1) or (2) is the current or valid entry, wherein a valid entry is that entry with equal timestamp controls at the front and back. Disaster recovery uses the valid entry with the latest timestamp to obtain control information. This control information, along with state information, is used for determining what record updates have been applied to the secondary storage controllers 124.

Consistency Groups

The record updates are handled in software groups called consistency groups, so that the SDM 122 can duplicate the record updates on the secondary DASDs 126 in the same order they were performed on the primary DASDs 118. The information used for creating the consistency groups (across all update records 200 collected from all primary storage controllers 116) includes the: operational timestamp 304; time interval group number 306; sequence number within group 308; primary controller SSID 310; records read time 314; primary device address 202; primary SSID 206; and status flags 208. The information used for determining whether all update records 200 for a time interval group have been received at the SDM 122 includes the: time interval group number 306; sequence number within group 308; physical controller ID 310; and the primary SSID 206.

After all READ UPDATE RECORD commands have been completed across all primary storage controllers 116 for a predetermined time interval, the PDM 112 interprets the received control information and groups the received update records 200 so that they may be applied at the secondary site 104 in the same sequence that the updates were originally performed on the primary DASDs 118. Thus, data integrity and consistency can be maintained at the secondary site 104. This process is hereinafter referred to as forming consistency groups.

Forming consistency groups is based on the following assumptions: (a) updates performed by the applications 108, 110 that are independent can be performed in any order if they do not violate the primary storage controller 116 sequence order; (b) updates performed by the application 108, 110 that are dependent must be performed in timestamp order (hence, an application 108, 110 cannot perform a dependent update #2 before receiving a control unit end and device end from update #1); and (c) a second update record 200 will always be either (1) in a same consistency group as an update record 200 with a later timestamp or (2) in a subsequent consistency group.

FIG. 6 illustrates an example of forming a consistency group, which could occur at either the primary site 102 or secondary site 104. In this example, update records 200 for the primary storage controllers 116 identified as SSID 1, SSID 2, and SSID 3 are shown. Time intervals T1, T2 and T3 are assumed to occur in ascending order. An operational timestamp 304 of time interval T1 is established for SSIDs 1, 2 and 3. The PDM 112 obtains the update records 200 from SSIDs 1, 2, and 3 for time interval T1–T3.

The update records 200 for SSIDs 1, 2, and 3 for time interval T1 are assigned to time interval group 1, G1 (time interval group number 306). The sequence number within group 308 is shown for each SSID 1, 2, and 3, wherein SSID 1 has update records 200 for three write I/O operations at 11:59. 12:00, and 12:01, SSID 2 has update records 200 for two write I/O operations at 12:00 and 12:02, and SSID 3 has update records 200 for three write I/O operations at 11:58, 11:59, and 12:02.

Consistency group N can now be formed based upon the control information and update records 200. In order to ensure that no update records 200 in time interval group #1 is later than any update records 200 in time interval group #2, a min-time is established which is equal to the earliest READ UPDATE RECORD time of the last update record 200 for SSID 1, 2, and 3. In this example then, min-time is equal to 12:01. Any update records 200 having a READ UPDATE RECORD time greater than or equal to min-time is included in the consistency group N+1. If the timestamps of two update records 200 for the same primary DASD 118 were equal (although unlikely given sufficient resolution of the sysplex timer 114), the update record 200 having the earlier sequence number within the time interval group N is kept with that group for consistency group N. The update records 200 are now ordered based upon READ UPDATE RECORD times. Update records 200 having equal times will cause the update record 200 having the lower sequence number to be place before the later-sequence-numbered update record 200. Alternatively, update records 200 having equal timestamps, but directed to differing primary DASDs 118, may be ordered arbitrarily as long as they are kept in the same consistency group.

If a primary storage controller 116 fails to complete a response to a READ UPDATE RECORD command during a specified time interval, then a consistency group cannot be formed until that primary storage controller 116 completes. In the event that the primary storage controller 116 fails to complete its operation, then a "missing" interrupt results, thereby causing a "system missing" interrupt handler to receive control and the operation will be terminated. On the other hand, if the primary storage controller 116 timely completes the operation, then the READ UPDATE RECORD will be driven to completion and normal operation will continue.

Consistency group formation expects that update records 200 for the primary storage controllers 116 will have timestamps. Some programs, however, will cause update records 200 to be generated without timestamps, in which case the primary storage controller 116 will return zeros for the timestamp. Consistency group formation can bound those update records 200 without timestamps based upon the time that the update record 200 was retrieved by the PDM 112. However, if too many update records 200 without timestamps occur over a time interval such that the update records 200 are not easily bounded by consistency group times, then the primary DASD 118 and secondary DASD 126 may be out of synchronization.

Logic for Generating and Collecting Update Records

Figure 7:
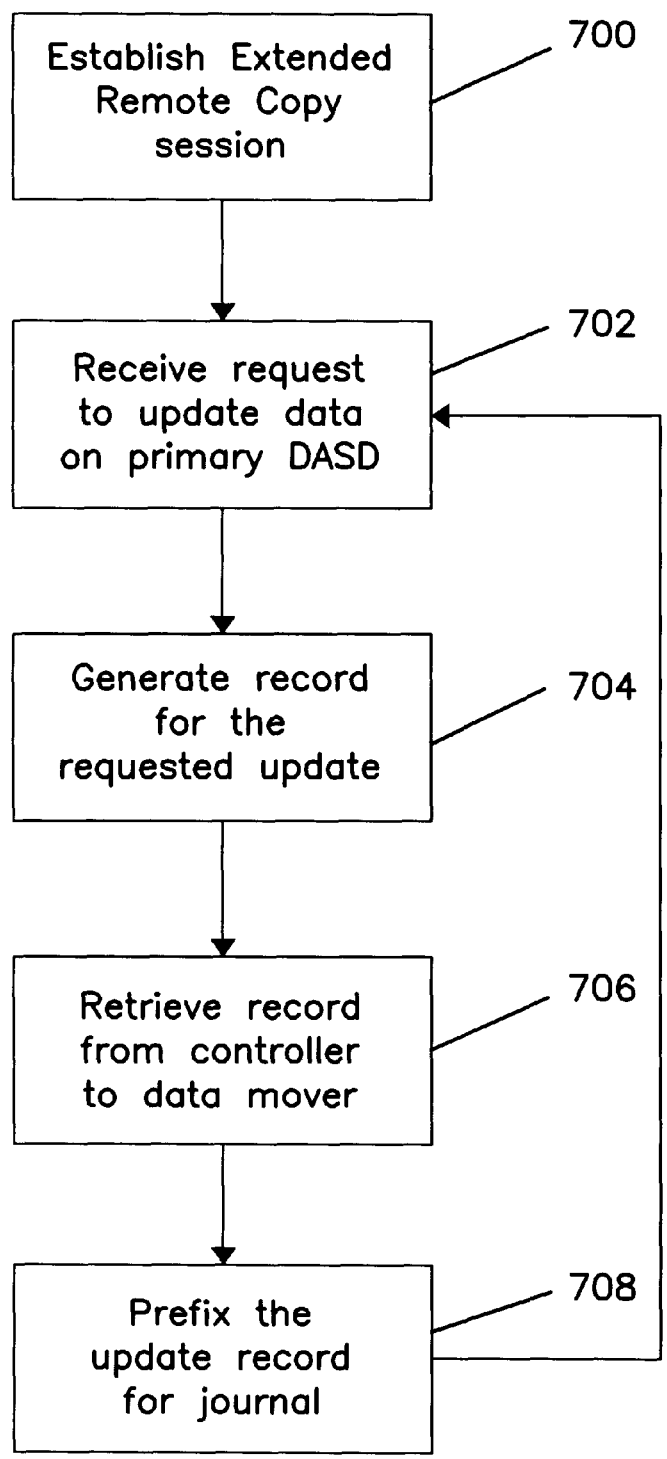
FIG. 7 is a flowchart illustrating the logic performed in generating and collecting update records according to the present invention.

FIG. 7 is a flowchart illustrating the logic performed in generating and collecting update records according to the present invention.

Block 700 represents the primary site 102 establishing the Extended Remote Copy session, which identifies those primary storage controllers 116 and primary DASDs 118 that will be "shadowed" and indicates that all updates to the identified primary DASDs 118 will be timestamped using the sysplex timer 114 as a synchronization clock.

Blocks 702–708 comprise a loop that represents the functions performed by the PDM 112, the identified primary storage controllers 116, and the identified primary DASDs 118 for each update that occurs.

Block 702 represents one of the primary storage controllers 116 receiving a request from one of the applications 108, 110 to update data stored on one of the primary DASDs 118 and then performing the requested update.

Block 704 represents the primary storage controller 116 generating an update record 200, for the requested operation.

Block 706 represents the PDM 404 retrieving the update record 200 from the primary storage controller 116, according to an interrupt or prompt, a predetermined timing interval, or a notification of more update records to read.

Block 708 represents the PDM 112 prefixing the update record 200 with a prefix header 300, thereby creating the journal record 500 necessary for forming consistency groups.

Logic for Forming Consistency Groups

Figure 8:
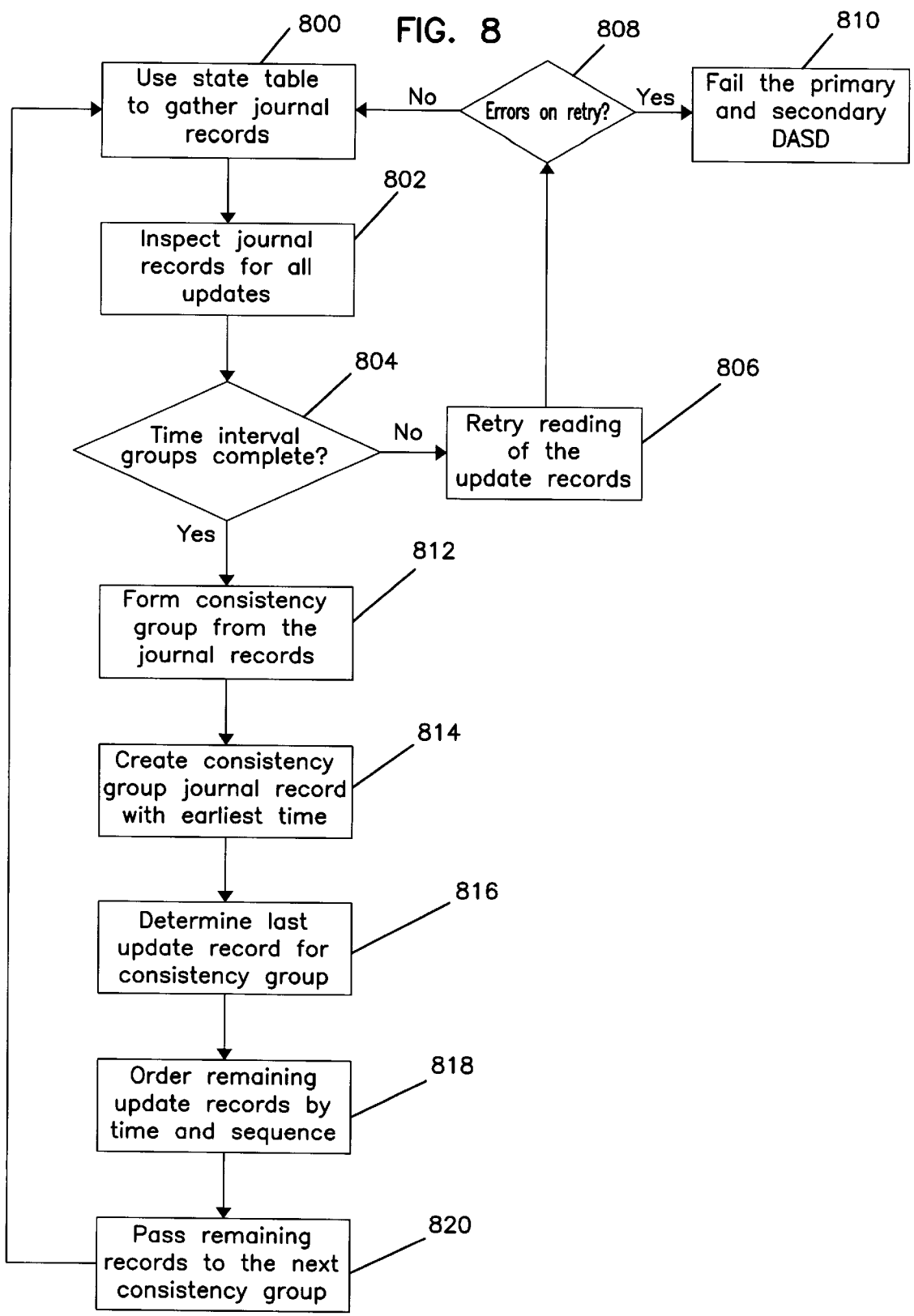
FIG. 8 is a flowchart illustrating the logic performed in forming consistency groups according to the present invention.

FIG. 8 is a flowchart illustrating the logic performed in forming consistency groups according to the present invention.

Block 800 represents the PDM 112 using the state table 400 to gather the journal records 500 by group and sequence numbers for each time interval group and primary storage controller 116.

Block 802 represents the PDM 112 inspecting the journal records 500 to determine whether all update records 200 have been received for each time interval group.

Block 804 is a decision block that represents the PDM 112 determining whether the time interval groups are complete, e.g., whether each primary storage controller 116 presented at least one update record 200 or confirmation was received that no such update records 200 exist.

If a time interval group is incomplete, then Block 806 represents the PDM 112 retrying the reading of the update records 200 from the primary storage controller 116 until the required update records 200 are received. If errors occur on the retry at Block 808, then Block 810 represents the PDM 112 failing the duplex volume pair comprised of the primary DASD 118 and the secondary DASD 126. Otherwise, control transfers to Block 800.

Having received complete time interval groups, Block 812 represents the PDM 112 forming a consistency group from the journal records.

Block 814 represents the PDM 112 creating a first consistency group journal record 500, which contains the earliest operational timestamp 304 and the earliest time of update 220 of all update records 200 having equal operational timestamps 304.

Block 816 represents the PDM 112 which update record 200 will be the last update record 200 to be included therein (some update records 200 will be dropped and included in the next consistency group journal record 500). The last update record 200 in the current consistency group journal record 500 is determined as a minimum update time (min-time) of the maximum update times for each primary storage controller 116 (that is, the last update of each primary storage controller 116 is compared and only the earliest of these remains in the current consistency group journal record 500).

Block 818 represents the PDM 112 ordering those remaining update records 200 in the current consistency group journal record 500 according to time of update 220 and sequence number within group 308. A primary storage controller 116 that had no update records 200 does not participate in the consistency group.

Block 820 represents the PDM 112 passing the remaining update records 200 of the current consistency group (having update times later than min-time) to the next consistency group. Each sequence number within a group 308 should end with a null buffer indicating that all update records 200 have been read for that operational time interval. Thereafter, control transfers to Block 800.

Logic Performing for Activity/Idle Analysis

Figure 9:
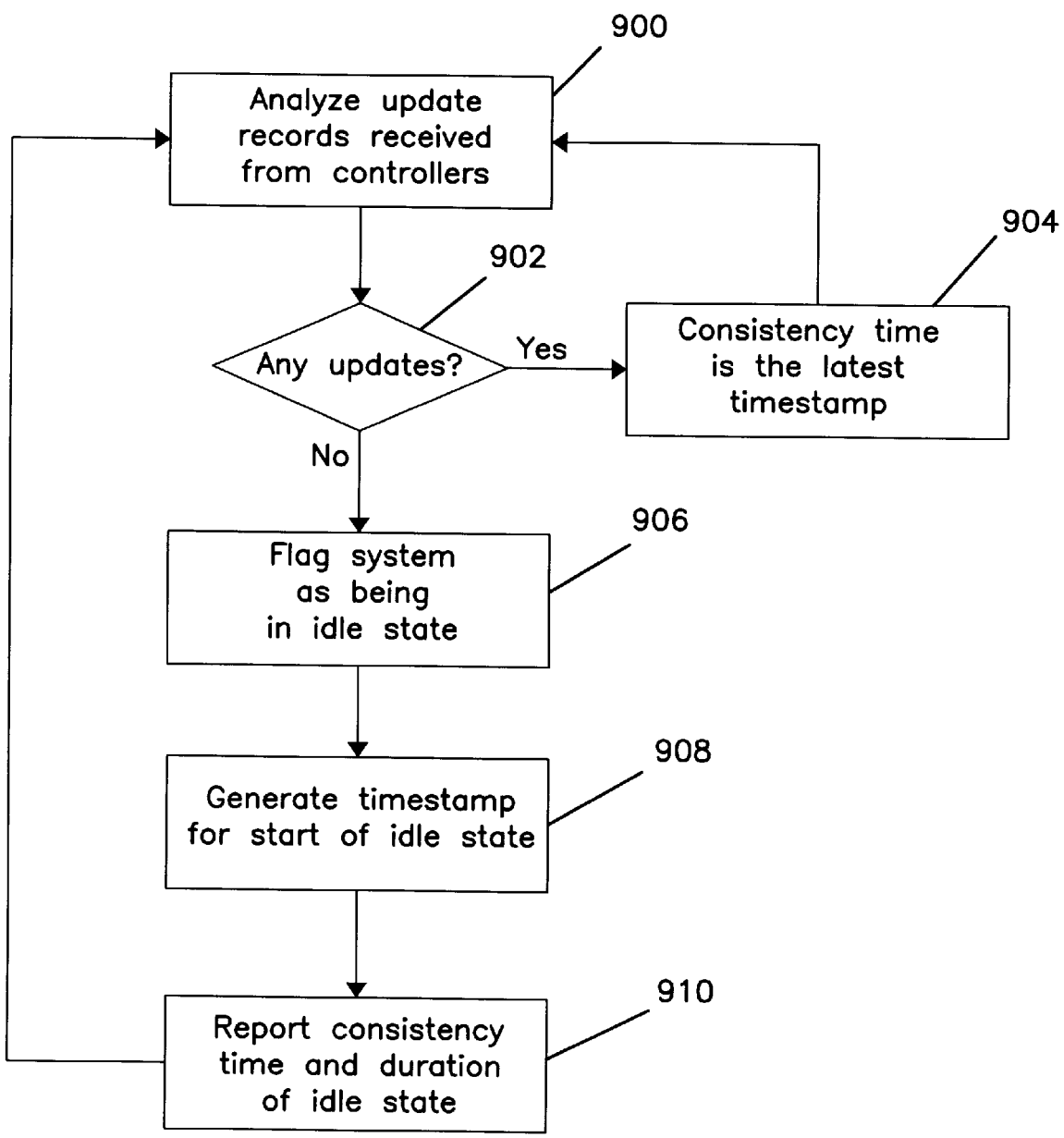
FIG. 9 is a flowchart illustrating the logic performed in performing activity/idle analysis according to the present invention.

FIG. 9 is a flowchart illustrating the logic performed in performing activity/idle analysis according to the present invention.

Block 900 represents the PDM 112 analyzing the update records 200 received from all of the primary storage controllers 116.

Block 902 is a decision block that represents the PDM 112 determining whether there have been updates on any of the primary storage controllers 116. If so, control transfers to Block 904; otherwise, control transfers to Block 906.

Block 904 represents the PDM reporting the latest timestamp as the PDM 112 consistency time. Thereafter, control transfers to Block 900.

On the other hand, if there have been no updates on any of the primary storage controllers 116 after a pre-determined time period, then the primary site 102 is considered to be in an idle state. In this situation, Block 906 represents the PDM 112 flagging the primary site 102 as being in an idle state, since there are no updates for any of the primary storage controllers 116, and Block 908 represents the PDM 112 generating a timestamp to denote the start of the idle state.

Upon request, or when updates are again generated for the primary storage controllers 116, Block 910 represents the PDM 112 reporting the last known PDM 112 consistency time and the total time that the primary site 102 has been in the idle state (based on the difference from the time when the primary site 102 entered the idle state to the time being reported by the PDM 112). The summation of both the last known PDM 112 consistency time and the total time in the idle state provides all the information required to manage both busy and idle environments.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to the hardware and software configuration illustrated herein. For example, other mainframes, minicomputers, personal computers, or networks of computers could be used with the present invention. In another example, peripherals other than those illustrated herein could benefit from the present invention.

In alternative embodiments of the present invention, data structures other than log-structured storage could be used. For example, the invention need not be restricted to journal data sets as illustrated herein.

In alternative embodiments of the present invention, other logic than that described herein could be performed without departing from the scope of the present invention. For example, the invention need not be restricted to the exact steps or elements illustrated herein.

In summary, a primary data mover monitors both consistency time and idle time in a system that performs continuous, asynchronous, extended remote copying between primary and remote processors, and manages both with accuracy and consistency. The primary data mover detects system activity levels and manages data accuracy for the extended remote copying in both active and idle systems.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An extended remote copying system, comprising:
   (a) a primary processor executing at least one computer program that generates write I/O operations;
   (b) a primary storage subsystem coupled to the primary processor and comprised of one or more primary storage controllers and one or more primary data storage devices for performing the write I/O operations generated by the computer program; and
   (c) a primary data mover executed by the primary processor for detecting levels of activity comprising the write I/O operations in the primary storage subsystem and reporting both active and idle conditions based thereon, wherein the idle condition indicates that there have been no updates received at the primary storage subsystem for a predetermined time period.

2. The system of claim 1, further comprising:
   (d) a secondary host processor coupled to the primary processor and located remotely therefrom;
   (e) a secondary storage subsystem coupled to the secondary processor and comprised of one or more secondary storage controllers and one or more secondary data storage devices for performing write I/O operations; and
   (f) a secondary data mover executed by the secondary processor for receiving data and control information from the primary data mover and for generating write I/O operations for the secondary storage subsystem in response thereto, wherein the write I/O operations duplicate the write I/O operations performed by the primary storage subsystem and preserve an order of the write I/O operations performed by the primary storage subsystem.

3. The system of claim 2, wherein the data and control information is sufficient to duplicate data stored on the primary storage system on the secondary storage subsystem.

4. The system of claim 1, wherein the primary storage subsystem generates update records that are transferred to the primary data mover, wherein the update records described the write I/O operations performed by the primary storage subsystem.

5. The system of claim 4, wherein the primary data mover groups the update records according to a time interval.

6. An extended remote copying system, comprising:
   a primary processor executing at least one computer program that generates write I/O operations;
   a primary storage subsystem coupled to the primary processor and comprised of one or more primary storage controllers and one or more primary data storage devices for performing the write I/O operations generated by the computer program, wherein the primary storage subsystem generates update records that are transferred to the primary data mover, wherein the update records describe the write I/O operations performed by the primary storage subsystem; and
   a primary data mover executed by the primary processor for detecting levels of activity comprising the write I/O operations in the primary storage subsystem and reporting both active and idle conditions based thereon, wherein the primary data mover monitors both consistency time and idle time using the update records.

7. An extended remote copying system, comprising:
   a primary processor executing at least one computer program that generates write I/O operations;
   a primary storage subsystem coupled to the primary processor and comprised of one or more primary storage controllers and one or more primary data storage devices for performing the write I/O operations generated by the computer program, wherein the primary storage subsystem generates update records that are transferred to the primary data mover, wherein the update records described the write I/O operations performed by the primary storage subsystem; and
   a primary data mover executed by the primary processor for detecting levels of activity comprising the write I/O operations in the primary storage subsystem and reporting both active and idle conditions based thereon, wherein the primary data mover obtains a latest consistency time from the update records generated by the primary storage controller that performed an update to the primary data storage device.

8. The system of claim 7, wherein the latest consistency time comprises a timestamp that marks a time the update was initiated by the primary processor.

9. The system of claim 7, wherein the primary data mover uses the latest consistency time to generate consistency groups to manage activity flow.

10. The system of claim 7, wherein the primary data mover uses the latest consistency time to determine a time duration of an idle condition.

11. A method for extended remote copying in a primary processor having a primary storage subsystem coupled thereto the primary processor, the primary storage subsystem being comprised of one or more primary storage controllers and one or more primary data storage devices for performing the write I/O operations, the method comprising the steps of:

(a) executing at least one computer program in a primary processor, wherein the computer program generates the write I/O operations performed by the primary storage controllers and primary data storage devices; and (b) detecting levels of activity in a primary data mover executed by the primary processor and reporting both active and idle conditions based thereon, wherein the levels of activity comprise the write I/O operations performed in the primary storage subsystem, and wherein the idle condition indicates that there have been no updates received at the primary storage subsystem for a predetermined time period.

12. The method of claim 11, further comprising:

(c) receiving data and control information from the primary data mover at a secondary data mover executed by a secondary processor; and (d) generating write I/O operations for a secondary storage subsystem coupled to the secondary processor and comprised of one or more secondary storage controllers and one or more secondary data storage devices for performing write I/O operations in response to the received data and control information, wherein the write I/O operations duplicate the write I/O operations performed by the primary storage subsystem and preserve an order of the write I/O operations performed by the primary storage subsystem.

13. The method of claim 11, wherein the data and control information is sufficient to duplicate data stored on the primary storage method on the secondary storage subsystem.

14. The method of claim 11, further comprising the steps of generating update records the primary storage subsystem and transferring the update records to the primary data mover, wherein the update records describe the write I/O operations performed by the primary storage subsystem.

15. The method of claim 14, further comprising the step of grouping the update records in the primary data mover according to a time interval.

16. A method for extended remote copying in a primary processor having a primary storage subsystem coupled thereto the primary processor, the primary storage subsystem being comprised of one or more primary storage controllers and one or more primary data storage devices for performing the write I/O operations, the method comprising:

executing at least one computer program in a primary processor, wherein the computer program generates the write I/O operations performed by the primary storage controllers and primary data storage devices; and detecting levels of activity in a primary data mover executed by the primary processor and reporting both active and idle conditions based thereon, wherein the levels of activity comprise the write I/O operations performed in the primary storage subsystem;

generating update records with the primary storage subsystem and transferring the update records to the primary data mover, wherein the update records describe the write I/O operations performed by the primary storage subsystem; and monitoring both consistency time and idle time in the primary data mover using the update records.

17. A method for extended remote copying in a primary processor having a primary storage subsystem coupled thereto the primary processor, the primary storage subsystem being comprised of one or more primary storage controllers and one or more primary data storage devices for performing the write I/O operations, the method comprising:

executing at least one computer program in a primary processor, wherein the computer program generates the write I/O operations performed by the primary storage controllers and primary data storage devices; and detecting levels of activity in a primary data mover executed by the primary processor and reporting both active and idle conditions based thereon, wherein the levels of activity comprise the write I/O operations performed in the primary storage subsystem;

generating update records with the primary storage subsystem and transferring the update records to the primary data mover, wherein the update records describe the write I/O operations performed by the primary storage subsystem; and obtaining a latest consistency time in the primary data mover from the update records generated by the primary storage controller that performed an update to the primary data storage device.

18. The method of claim 17, wherein the latest consistency time comprises a timestamp that marks a time the update was initiated by the primary processor.

19. The method of claim 17, further comprising the step of using the latest consistency time in the primary data mover to generate consistency groups to manage activity flow.

20. The method of claim 17, further comprising the step of using the latest consistency time in the primary data mover to determine a time duration of an idle condition.

21. An article of manufacture embodying a primary data mover computer program that when executed in a primary processor causes the primary processor to perform a method for extended remote copying, the article of manufacture comprising the steps of:

(a) monitoring write I/O operations performed by a primary storage subsystem coupled to the primary processor, the primary storage subsystem being comprised of one or more primary storage controllers and one or more primary data storage devices for performing the write I/O operations; and (b) detecting levels of activity based on the monitored I/O operations and reporting both active and idle conditions based thereon, wherein the idle condition indicates that there have been no updates received at the primary storage subsystem for a predetermined time period.

22. The article of manufacture of claim 21, wherein the method further comprises the steps of:

(c) receiving data and control information from the primary data mover at a secondary data mover executed by a secondary processor; and (d) generating write I/O operations for a secondary storage subsystem coupled to the secondary processor and comprised of one or more secondary storage controllers and one or more secondary data storage devices for performing write I/O operations in response to the received data and control information, wherein the write I/O operations duplicate the write I/O operations performed by the primary storage subsystem and preserve an order of the write I/O operations performed by the primary storage subsystem.

23. The article of manufacture of claim 21, wherein the data and control information is sufficient to duplicate data stored on the primary storage method on the secondary storage subsystem.

24. The article of manufacture of claim 21, wherein the method further comprises the steps of generating update records the primary storage subsystem and transferring the update records to the primary data mover, wherein the update records describe the write I/O operations performed by the primary storage subsystem.

25. The article of manufacture of claim 24, wherein the method further comprises the step of grouping the update records in the primary data mover according to a time interval.

26. An article of manufacture embodying a primary data mover computer program that when executed in a primary processor causes the primary processor to perform a method for extended remote copying, the article of manufacture comprising:

monitoring write I/O operations performed by a primary storage subsystem coupled to the primary processor, the primary storage subsystem being comprised of one or more primary storage controllers and one or more primary data storage devices for performing the write I/O operations;

detecting levels of activity based on the monitored I/O operations and reporting both active and idle conditions based thereon;

generating update records with the primary storage subsystem and transferring the update records to the primary data mover, wherein the update records describe the write I/O operations performed by the primary storage subsystem; and monitoring both consistency time and idle time in the primary data mover using the update records.

27. An article of manufacture embodying a primary data mover computer program that when executed in a primary processor causes the primary processor to perform a method for extended remote copying, the article of manufacture comprising:

monitoring write I/O operations performed by a primary storage subsystem coupled to the primary processor, the primary storage subsystem being comprised of one or more primary storage controllers and one or more primary data storage devices for performing the write I/O operations;

detecting levels of activity based on the monitored I/O operations and reporting both active and idle conditions based thereon;

generating update records with the primary storage subsystem and transferring the update records to the primary data mover, wherein the update records describe the write I/O operations performed by the primary storage subsystem; and obtaining a latest consistency time in the primary data mover from the update records generated by the primary storage controller that performed an update to the primary data storage device.

28. The article of manufacture of claim 27, wherein the latest consistency time comprises a timestamp that marks a time the update was initiated by the primary processor.

29. The article of manufacture of claim 27, wherein the method further comprises the step of using the latest consistency time in the primary data mover to generate consistency groups to manage activity flow.

30. The article of manufacture of claim 27, wherein the method further comprises the step of using the latest consistency time in the primary data mover to determine a time duration of an idle condition.

* * * * *